Oct. 4, 1949.　　　　A. C. LIND　　　　2,483,706
APPARATUS FOR CLARIFYING LIQUIDS
Filed June 6, 1944　　　　2 Sheets-Sheet 1
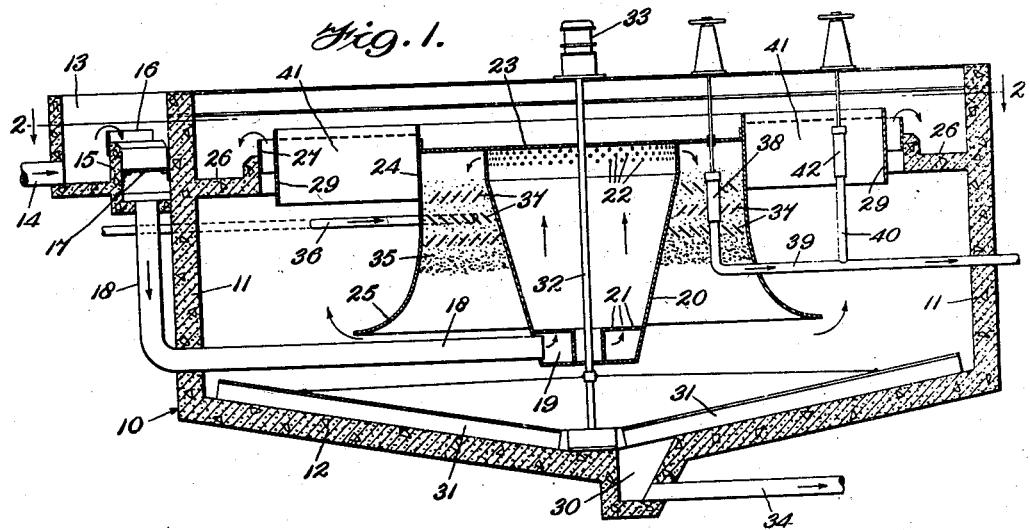
Inventor
Arthur C. Lind.

Oct. 4, 1949.   A. C. LIND   2,483,706
APPARATUS FOR CLARIFYING LIQUIDS
Filed June 6, 1944   2 Sheets-Sheet 2

Inventor
Arthur C. Lind,
By
B. B. Collings
Attorney

Patented Oct. 4, 1949

2,483,706

UNITED STATES PATENT OFFICE 2,483,706

APPARATUS FOR CLARIFYING LIQUIDS

Arthur C. Lind, Milwaukee, Wis., assignor to Chain Belt Company, Milwaukee, Wis., a corporation of Wisconsin Application June 6, 1944, Serial No. 538,951

1 Claim. (Cl. 210—2)

The invention relates to liquid separation or clarification, and has for its principal object the provision of an improved apparatus for the separation and removal of oil and similar floating material from sewage, industrial wastes, etc.

In the purification of wastes from oil refineries for example, which is now required or practiced in many localities, one of the most difficult problems involved has been the removal of certain of the heavier oils or greases having a specific gravity approximately the same as that of the water with which they are mixed. When such wastes are introduced into the usual clarification tanks, because of this substantial equality of specific gravities, such oils or greases will neither readily rise to the top nor settle to the bottom of the liquid, from either of which places they could be easily withdrawn. The present invention however, provides a relatively simple method and apparatus for overcoming this difficulty.

Two forms of apparatus constructed and arranged in accordance with the invention are illustrated in the accompanying drawings forming a part of this specification, in which like reference characters designate like parts throughout the views, and in which:

Figure 1 is a central vertical sectional view of a circular tank type of clarifying apparatus, having a central feed for the raw sewage, waste, etc., and a perimetric discharge for the clarified liquid;

Fig. 2 is a sectional plan view of the apparatus shown in Fig. 1, on the plane indicated by the line 2—2 in the latter figure;

Figure 3:
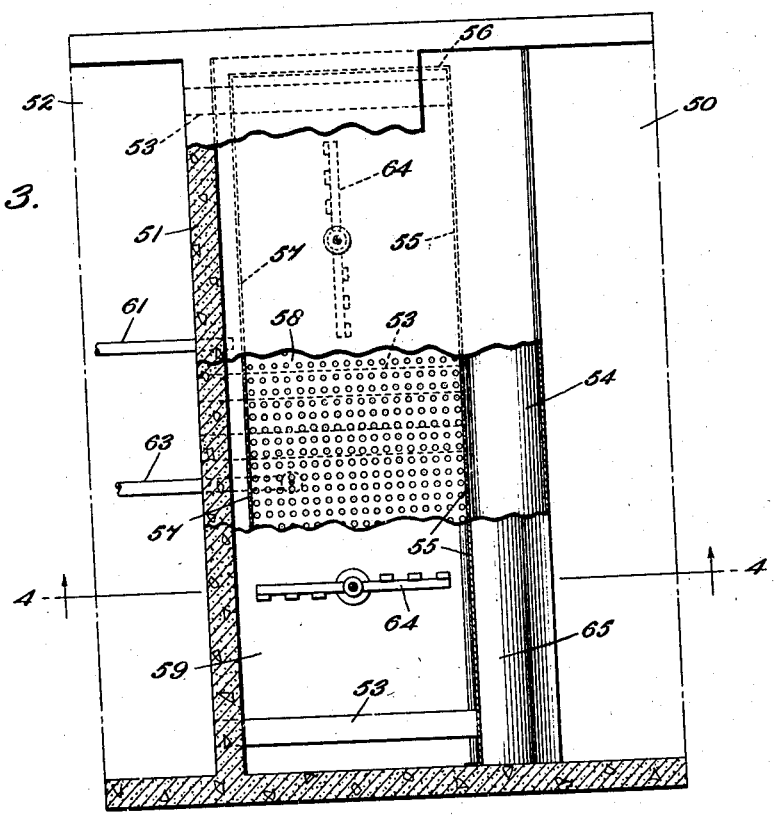
Fig. 3 is a plan view, partly broken away and in section, of a modified form of apparatus suitable for use in a rectangular type of clarifying tank.

Referring more particularly to Figs. 1 and 2, the circular clarifying tank 10, having a perimetric wall 11 and a coniform bottom 12, is provided with a receiving chamber 13 to which the raw sewage or waste is supplied by a pipe or conduit 14. Within the chamber 13 is a partition wall 15 carrying a weir 16 over which the liquid may flow to and through a screen or strainer 17 and thence through an influent pipe 18 to a chamber 19 provided in the bottom portion of a centrally disposed feed well 20. The top wall of the chamber 19 is perforated, as indicated at 21, so that the liquid may flow upwardly in the well 20. While here shown as flaring outwardly in an upward direction, if desired this well may be cylindrical, but in either case the upper portion of its wall is perforated as at 22. The top of the well is closed by a cover plate 23 which extends beyond the well walls to an annular member 24, forming therewith a concentric mantle, the lower portion of which may be flared outwardly as at 25. An effluent launder 26, having an overflow weir 27, is provided around the upper portion of the side wall 11 of the tank, from which launder the clarified liquid may be discharged through a pipe 28. An annular baffle 29 may be provided adjacent the weir 27.

The bottom 12 of the tank 10 is formed with a sump 30 into which settleable constituents of the sewage or waste liquor may be scraped by a rotary sludge collector 31, carried by a shaft 32 operable by a motor 33. The sludge is withdrawn from the sump 30 through a pipe 34.

As best shown in Fig. 1, the walls of the mantle 24 are spaced from those of the feed well 20, providing an annular zone 35 in which a scum blanket will be formed by the lighter floatable oils carried by the liquid. Since these may not be present in sufficient quantity and/or may not be solvents for the heavier oils or greases mentioned above, a pipe 36 leads into the zone 35 through which lighter oils or other suitable solvents or diluents for the said heavier oils or greases which it is desired to separate may be introduced into the scum blanket. Means, such for example as baffles 37, are preferably provided in the zone 35 to secure an intimate intermixture of the diluent with the waste liquor.

A draw-off valve 38 is provided in the scum zone 35, which when opened permits scum in said zone to be withdrawn through a pipe 39, for suitable treatment whereby the diluent may be recovered and subsequently returned to the zone through pipe 36. A branch 40 of said pipe 39 extends into the annular zone 41 between the baffle 29 and the upper portion of the mantle 24, where it is provided with a draw-off valve 42 through which any diluted and/or floatable oils or greases escaping from the bottom of mantle 24 may be withdrawn.

The operation of this form of apparatus will be readily understood from the foregoing description. The sewage, waste liquor or the like is introduced through pipe 14, chamber 13 and pipe 18 to chamber 19 at the bottom of the feed well 20. It will rise in this well, to be discharged at the top thereof through the perforations 22 into the annular space between the well and the mantle 24. Here it will pass downwardly through the scum blanket in the zone 35 to emerge from the bottom of the said mantle. As the liquor passes through the blanket, the lighter oils or diluents in the latter are intimately mixed therewith by the baffles 37 and, acting as solvents for the heavier oils or greases carried by the liquor, reduce the specific gravity of the latter so that at least a major portion thereof will not pass through the blanket but will be retained therein for withdrawal through the valve 38 and pipe 39. Any such lightened oils or greases as may escape from the open bottom of the mantle 24 will readily rise to the annular zone 41, from which they may be withdrawn through valve 42 and pipes 40 and 39. The clarified liquid flows over the weir 27 into the effluent channel 26 and is discharged through pipe 28.

Figure 4:
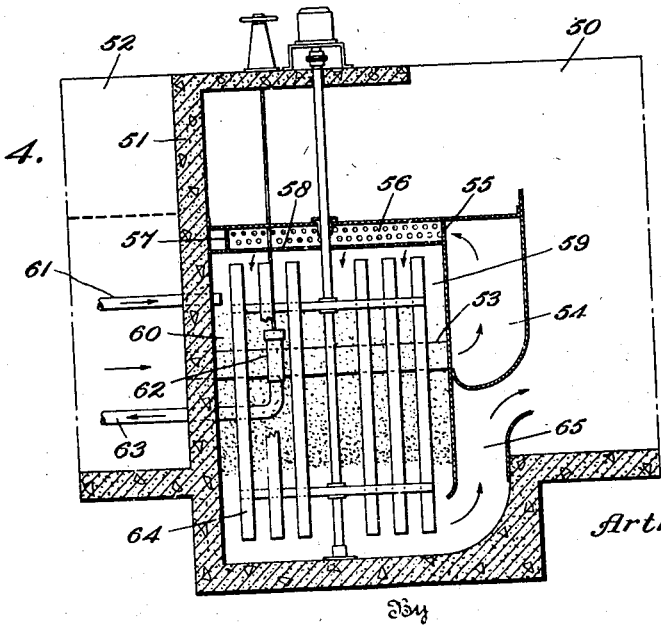
Fig. 4 is a vertical sectional view on approximately the plane indicated by the line 4—4 of Fig. 3, looking in the direction of the arrows.

The apparatus illustrated in Figs. 3 and 4 is suitable for use in a well known form of rectangular clarifying tank and is here shown as disposed at the influent end of such a tank. This tank 50 has an end wall 51 separating the clarifying chamber from the influent channel 52. A plurality of influent pipes or ducts 53 extend through the wall 51 and conduct the sewage or waste liquor from the channel 52 to a distributing box or chamber 54 which extends transversely of the tank 50 at some distance from the wall 51. The liquor is discharged from the upper portion of the box 54 through perforated partitions 55, 56, 57 and 58 to a compartment 59 in which a scum blanket 60 is formed. Diluent or solvent oils may be supplied to the scum zone through a pipe 61, and the scum may be removed from the zone through a draw-off valve 62 and pipe 63. One or more power driven rotary stirrers or scrubbers 64 are mounted in the compartment 59, to secure a thorough intermixture of the diluent and liquor. After passing through the scum blanket 60 the clarified liquid escapes from the lower portion of the compartment 59 through a channel 65 leading to the main chamber of tank 50.

It will be noted that the scum blanket is sealed from the outside atmosphere whereby undue evaporation is prevented.

It will be obvious that those skilled in the art may vary the precise details of construction and arrangement of parts constituting the apparatus, without departing from the spirit of the invention, and therefore it is not wished to be limited to the above disclosure except as may be required by the claim.

What is claimed is:

In apparatus for treating an impure liquid to separate therefrom suspended oily and greasy impurities having a specific gravity approximately equal to that of the liquid whereby they will neither readily rise to the surface nor settle to the bottom thereof: a tank for containing a body of the liquid; a tubular feed well disposed below the surface of such body of liquid and having egress ports in its upper portion; a mantle closing the top and surrounding the sides of said feed well in spaced relation thereto to provide a segregated scum zone in the body of liquid out of contact with the external atmosphere; means for introducing into said zone a solvent for said oily and greasy impurities having a lower specific gravity than the latter; means for supplying raw impure liquid to the bottom of said feed well for passage through the ports thereof into said zone to bring the oily and greasy impurities suspended in such liquid into contact with the solvent in the zone, whereby the said impurities may have their specific gravity lowered and thereby be retained in the zone while the freed liquid passes therethrough; means for discharging such freed liquid; and means for withdrawing accumulations of the lighted impurities from the zone.

ARTHUR C. LIND.

REFERENCES CITED

The following references are of record in the file of this patent:

UNITED STATES PATENTS

| Number | Name | Date |
|---|---|---|
| 612,904 | Hulssner et al. | Oct. 25, 1898 |
| 691,365 | Dittler | Jan. 21, 1902 |
| 883,608 | Antoine | Mar. 31, 1908 |
| 1,194,000 | Dobyns | Aug. 8, 1916 |
| 1,715,438 | Travers | June 4, 1929 |
| 1,821,266 | Lewis | Sept. 1, 1931 |
| 1,955,064 | Hawley | Apr. 17, 1934 |
| 2,146,542 | Hawley | Feb. 7, 1939 |
| 2,211,565 | Hawley | Aug. 13, 1940 |
| 2,226,532 | Hawley | Dec. 31, 1940 |
| 2,311,830 | Hawley | Feb. 23, 1943 |